April 13, 1943.  O. MORGENSEN, JR  2,316,178
AIRPLANE WHEEL CHOCK
Filed March 3, 1941   2 Sheets-Sheet 1
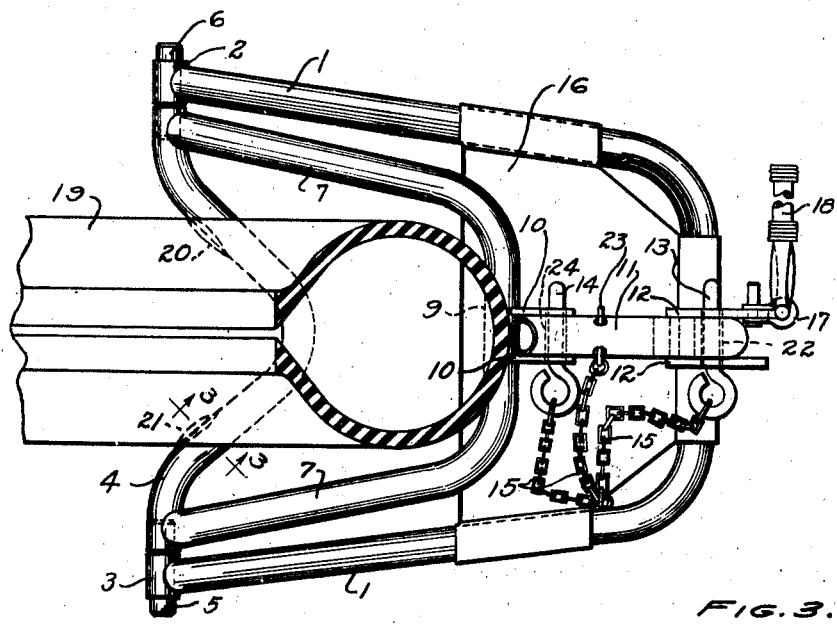
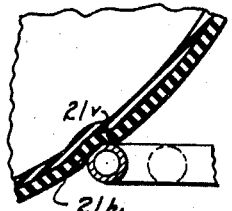
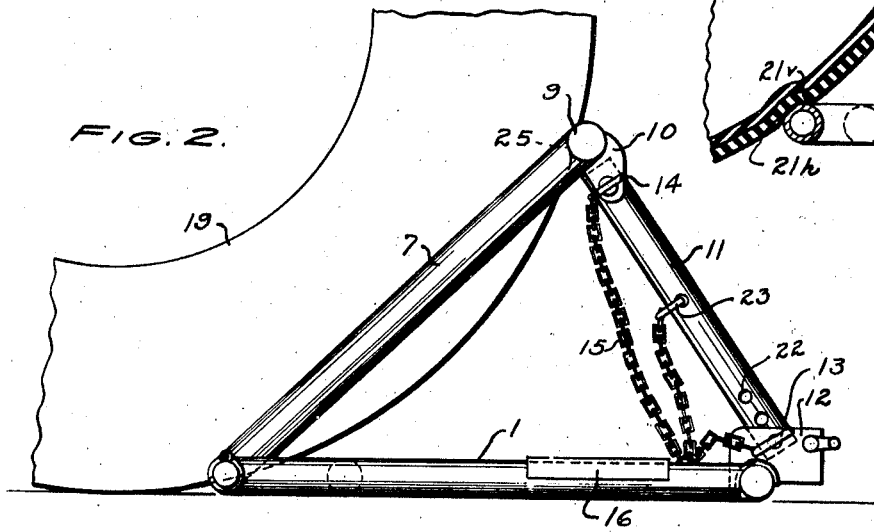
INVENTOR
OTTO MORGENSEN, JR.
ATTORNEYS

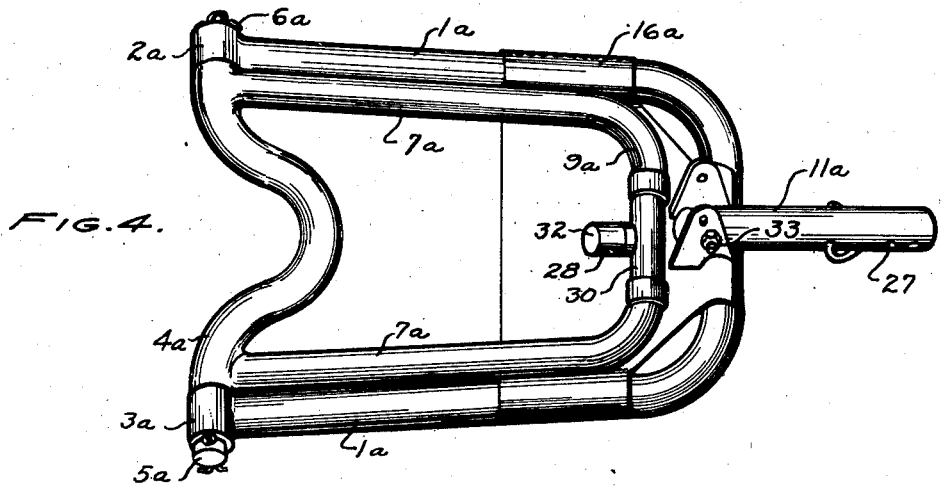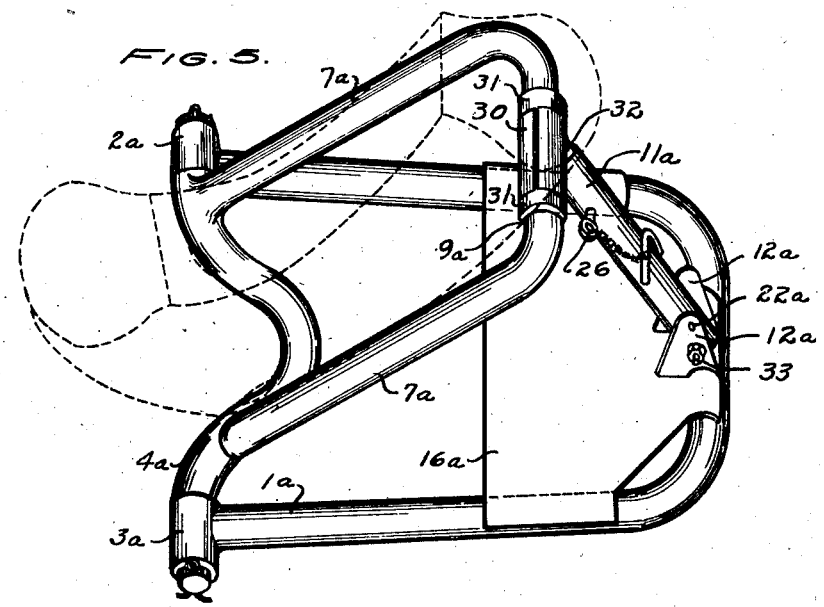

Patented Apr. 13, 1943

2,316,178

UNITED STATES PATENT OFFICE 2,316,178

AIRPLANE WHEEL CHOCK

Otto Morgensen, Jr., Dayton, Ohio

Application March 3, 1941, Serial No. 381,473

12 Claims. (Cl. 188—32)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to chocks, and particularly to airplane wheel chocks which will effectively restrain the motion of the wheel and which may be readily removed from the wheel.

It is an object of this invention to provide a chock which may be easily and quickly removed from the wheel by the application of a lateral force of a magnitude well within human capabilities.

It is a further object of this invention to provide a chock which may be readily adapted for wheels of different rolling radii, to control the area of tire overlay on the toe plate.

It is another object of this invention to provide a chock having a toe plate of such a construction and an abutment member so associated therewith that the tire will automatically come to rest on the chock with only sufficient tire overlay on the toe plate to hold the wheel in restrained position.

It is yet a further object of this invention to provide a chock with a toe plate arranged to cooperate with a side, or lateral edge, of the tire to serve as a fulcrum for a laterally applied chock-removing force.

It is still another object of this invention to provide a lightweight foldable chock with which the wheel may be readily brought into operative relationship and from which the chock may be readily and easily removed, and yet one which is operative to effectively restrain wheel movement.

Other objects of the invention will appear from the following description taken in conjunction with the drawings, in which:

Fig. 1 is a plan view of the chock with a wheel and tire in restrained position.

Fig. 2 is an elevational view of the chock in operative position.

Fig. 3 is a detailed sectional view taken along the lines 3—3 of Fig. 1.

Fig. 4 is a plan view of the chock in collapsed, or folded, condition with modified structural details.

Fig. 5 is a perspective view of the chock in Fig. 4 in operative position with the tire of a restrained wheel shown dotted therein.

Referring to the drawings, and particularly to Figs. 1, 2, and 3, the chock is formed of an open-ended support-engaging or base member 1 having journals or bearings 2 and 3 integral with the ends of the legs thereof for pivotally receiving trunnions 5 and 6 of the V-shaped toe plate member 4. Integrally united with the toe plate member 4 is a frame member 7 having a portion 9 constituting an abutment member against which the tire 19 of a wheel restrained by the chock is adapted to rest as at 25. In the preferred embodiment of the invention, member 7 is shown integral with toe plate 4. However, it is to be understood that the same may be pivotally attached thereto if so desired.

Integral with the back side of member 9 is a pair of plate members 10 having pin-receiving openings therein and spaced apart to operatively receive strut member 11 having corresponding openings 24 therein for receiving pin 14, adapted to releasably connect one end of the strut to the plates. The other end of the strut is provided with a plurality of openings 22 adapted to be aligned with corresponding openings in plates 12. The plates 12 are integral with the upper rear portion of base member 1 and suitably spaced apart to adjustably receive the lower end of the strut. The pin 13 is adapted to releasably detachably connect the lower end of the strut to the plate members. Loss of the strut member and pins is prevented by fastening them to chains 15 connected at one end to base member 1 and at the other end to pins and clip 23 attached to the strut member. Attached to the base member is a pad member 16 which functions to prevent sinking of the base member when the chock is used on soft earth. To one of the plates 12 is attached a clevis 17 and a rope 18 for applying a lateral force to the chock for separating and removing it from the wheel.

In the operation of the device, the strut member 11 is adjusted for the rolling radius of the particular wheel to be received in the chock. When the wheel rolls upon the chock, the tire first engages the toe plate thereof to prevent slipping of the chock during the remainder of the rolling motion. The tire then engages the member 9, being compressed sufficiently thereby in stopping the motion of the wheel, as at 25, to roll the wheel back until it overlays the toe plate member of the chock a predetermined amount by a sufficient area to transmit only a wheel restraining force to the chock. Since the toe plate member is V-shaped, the tire will engage it at laterally-spaced-apart areas 20 and 21. Each of these areas comprises an area located at approximately the junction of the sidewall and tread of the tire overlying the legs constituting the V-shaped toe plate, as at 21v in Fig. 3, and an area 21h against the side of the toe plate member. The areas overlying the toe plate member are, when the abutment member 9 is properly adjusted, of only sufficient area to transmit to the toe plate member such a part of the wheel load that the chock will be held in wheel-restraining position. The area at 21h serves as a fulcrum for a force laterally applied to the chock through rope 18. As a result of this construction, only a sufficient portion of the wheel load is applied to the chock to hold it in place, and not so great a force but that the chock may be readily removed from the wheel.

It is to be understood that in its broadest aspect the chock may be made solid, it only being necessary to provide sufficient clearances so that the tire is in engagement therewith at only the three preselected areas. In the solid chock embodiment of the invention, the abutment portion 9 may be made a separate part adjustably mounted. However, in the preferred embodiment of the invention the chock is made in skeleton form of lightweight tubular or other material, the parts of which are pivotally connected at suitable places so that the chock may be collapsed or folded.

In the preferred embodiment, the chock may be folded by removing either pin 13 or 14, or both of these pins, and folding the frame and toe plate members with respect to the base member. The strut member may be tilted to any suitable out-of-the-way position when carried by either the base member or the frame member, and when detached from both members, may be placed between the pad 16 and the frame.

In the embodiment of the invention shown in Figs. 4 and 5, the base member 1a, journals 2a and 3a, trunnions 5a and 6a, V-shaped toe member 4a, arms 7a, abutment member 9a, strut 11a, plates 12a, openings 22a, and pad 16a are the same as the corresponding parts in the preferred embodiment of the invention illustrated in Fig. 1, the pad 16a being soldered, welded or otherwise suitably connected to the base member.

In this embodiment of the invention, the abutment member 9a is provided with a pair of collars 31 for confining a sleeve 30 rotatably mounted on member 9a. Integral with the sleeve 30 is a stud member 32 adapted to be received in strut member 11a. Pin 26 is adapted to be received in selected openings 27 and 28 for fastening the strut to the stud member. The other end of the strut member may be fastened to the plate members 12a by bolt 33. It is to be understood that the bolt 33 may be replaced by a pin, and the strut member moved into folded position, with the stud member 32 in position between arms 7a.

Although a single preferred embodiment of the invention has been described, it is to be understood that changes and modifications may be made in the device without departing from the spirit and substance of invention. Various modifications and changes may be made by those skilled in the art without departing from the inventive concept, and it is intended that the invention be limited only by the scope of the appended claims.

I claim:

1. A wheel chock comprising a support-engaging member, a frame member connected at one end to said support-engaging member and arranged at an acute angle with respect thereto, a V-shaped member connected to one of said members and lying substantially in the plane of said support-engaging member, and a strut connecting said support-engaging member to the other end of said frame member, said members being so constructed and arranged that a tire restrained by said chock will have an area overlying an upper portion of said V-shaped member and a portion alongside of said V-shaped member for the purpose specified.

2. A wheel chock comprising an open ended support-engaging member, a frame member pivotally connected to said support-engaging member at the open end thereof, said frame member including; a V-shaped portion lying in substantially the same plane as and across the open end of said engaging member, and a portion inclined with respect to said support-engaging portion.

3. A device as recited in claim 2 and further including a strut connecting said support-engaging member and said inclined portion of said frame.

4. A device as recited in claim 2 and further including a strut pivotally connected to said support-engaging member and releasably connected to said inclined portion of said frame.

5. A wheel chock comprising a base member, a member inclined with respect to said base member and having a tire-engaging abutment, a strut connecting the upper portion of said inclined member to the rearward portion of said base member and a V-shaped toe plate connecting said base and inclined members and lying substantially in the same plane as the said base member.

6. A device as recited in claim 5 in which said base member comprises a framework having a pad connected to the rearward portion thereof.

7. A wheel chock comprising an open ended support-engaging member, a frame member pivotally connected to said support-engaging member at the open end thereof, and a strut pivotally connected to one of said members and adjustably connected to the other of said members, said frame member including a V-shaped portion lying in substantially the same plane as the said support-engaging member and a portion operatively arranged at an acute angle with respect to said support-engaging portion, whereby a tire in engagement with said V-shaped member and said frame member will have a portion in engagement with an upper portion of said V-shaped member and a portion alongside of said V-shaped member.

8. A wheel chock having a tire-engaging toe member and an abutment member spaced upwardly and rearwardly therefrom, said toe member being formed by legs rearwardly directed at such a predetermined acute angle with respect to each other and at such a predetermined distance from said upwardly and rearwardly spaced abutment that when the wheel is restrained in the chock, areas of the tire located at the sides thereof at approximately the junction of the sidewall and tread of the tire overlie the said legs only sufficiently to transmit to them a chock restraining portion of the wheel load.

9. A device as recited in claim 8 in which said areas of the tire press against the inner sides of said legs to thereby selectively constitute a fulcrum for a laterally applied chock-removing force.

10. A wheel chock comprising a support-engaging member, a V-shaped toe member, an abutment member spaced a predetermined distance upwardly and rearwardly from said toe member so that when the wheel is restrained in the chock with the tire in engagement with the said abutment member, the edges of the tire press against and overlie a portion of the edges of the toe plate, means angularly adjustably connecting said abutment member to said support-engaging member to produce—for different sized tires—overlying areas of the tire of only sufficient size to transmit to the toe member a chock-restraining portion of the wheel load, the areas where the tire presses against the toe plates selectively constituting a fulcrum for a laterally applied chock-removing force.

11. A wheel chock comprising an open framework base member, an abutment member, a toe member connected thereto and an upwardly and rearwardly spaced abutment member carried thereby, said toe member being formed of leg members rearwardly directed at such a predetermined acute angle with respect to each other and at such a predetermined distance from said abutment member that when the wheel is restrained in the chock, areas of the tire located at the sides thereof at approximately the junction of the sidewall and tread of the tire overlie the said leg members only sufficiently to transmit to them a chock-restraining portion of the wheel load.

12. A wheel chock comprising a support-engaging member, a frame member pivotally connected at one end to said support-engaging member, said frame member including a V-shaped toe member and an abutment member spaced upwardly and rearwardly at such a distance therefrom that, when the wheel is restrained in the chock, the edges of the tire press against and overlie a portion of the edges of the toe plate, a strut member angularly adjustably connecting said frame member to said support-engaging member to produce—for different sized tires—overlying areas of the tire of only sufficient size to transmit to the toe plate a chock-restraining portion of the wheel load, the areas where the tire presses against the toe plate selectively constituting a fulcrum for a laterally applied chock-removing force.

OTTO MORGENSEN, Jr.